Patented July 9, 1929.

1,720,192

UNITED STATES PATENT OFFICE.

ARCHIE J. WEITH, OF EVANSTON, AND OTTO HOLZMAN, OF CHICAGO, ILLINOIS, ASSIGNORS TO BAKELITE CORPORATION, OF NEW YORK, N. Y., A CORPORATION OF DELAWARE.

MOLDING MIXTURE AND METHOD OF MAKING SAME.

No Drawing.      Application filed June 9, 1924. Serial No. 718,967.

This invention comprises a novel molding mixture consisting essentially of a reactive phenolic resin, and a cellulose ester, preferably cellulose acetate, which possesses a fibrous structure and is capable of performing in the mixture the essential functions of the wood-flour which is a commonly-used component of molding mixtures of this type.

It has been heretofore proposed, as for example in U. S. Patent 1,209,165 granted December 19, 1916, to Whitney B. Jones, to incorporate cellulose esters, including cellulose acetate, in minor proportions with phenol resins, particularly with a view to obtaining a varnish capable of yielding a hard but relatively flexible coat. According to this particular patent, the cellulose acetate constitutes approximately 10 percent of the mass, including the solvent; and it is not present in sufficient proportions nor introduced under suitable conditions to yield a mixture which can be shaped by the hot-press molding methods commonly used in this art. In other words, the composition is not a molding mixture. The present invention, on the contrary, contemplates a true molding mixture wherein the cellulose ester, after being reduced to a physical state of minute subdivision, is incorporated with the resin in proper proportion to constitute a true filler therefor, replacing wholly or in part the usual wood-flour with advantages for specific purposes as hereinafter pointed out.

The preferred procedure in carrying the invention into effect is as follows:

The fibrous cellulose acetate of commerce is ground in a ball mill to an impalpable powder, which for the best results should all pass a 100-mesh screen. A potentially-reactive phenol resin is similarly ground; and thereafter the two materials are mixed, preferably in approximately 1:1 proportions, and the mixture is further ground until the components have been thoroughly commingled into a homogeneous mass. Appropriate dyes or coloring materials may be and usually are incorporated during the grinding operation. Thorough and fine grinding is important.

As is now well understood in this art, the potentially reactive phenolic resin may comprise either such phenol-aldehyde compositions as are directly transformable by sufficient heating to the infusible state; or mixtures of phenol resins of the permanently fusible type with hardening agents of aldehyde type or derivation, such as formaldehyde, paraform, hexamethylenetetramine and the like. Methods of preparing such potentially-reactive resin compositions are now well known in this art and need not be further described herein.

Instead of separately milling the ester and the phenolic resin and re-milling the mixture as described above, the cellulose acetate which is the slower-milling component may first be milled to about three-fourths completion, after which the resin may be introduced and the milling completed. The invention is not restricted to any particular mechanical procedure in preparing the mixture.

The resulting molding mixture may be treated in all respects like the usual wood-flour-resin molding mixtures, being molded in the hot-press under substantially the usual molding conditions as respects temperature and time. Thus prepared, the resulting article differs entirely from the usual molded products, especially in that it is translucent; that when dyed it presents a peculiar and altogether distinctive depth and richness of color; and that it has a distinctive feeling suggesting that of jade.

This molded product is to be clearly distinguished from the familiar phenol resin products which are prepared by casting the resin while yet fusible and subsequently hardening. These latter may be rendered translucent by certain additions, usually of a fatty nature; but they lack the toughness which characterizes the molded products having a fibrous filler. The molded product prepared according to this invention does not possess in full measure the toughness which characterizes the wood flour-resin compositions, but it is far tougher than the pure resin.

While it is preferred to employ the phenolic resin and the cellulose ester in substantially equal proportions by weight, the invention is not restricted to these specific proportions, although the proportion of the cellulose ester should be sufficiently high to confer on the mixture the capability, which is not possessed by the unmixed resin, of being molded under standard hot-press conditions. Approximately equal proportions by weight of resin and ester insure such capability.

Although cellulose acetate is the preferred ester, other cellulose esters of similar physical character, as for example cellulose formate, are to be regarded as equivalent thereto.

The degree of translucence of the final product may be increased, if desired, by the use of plasticizing agents which are capable of entering into solid solution with the product. We have found that phosphoric acid esters, as for example monophenyl di-cresol phosphate and the like, are especially suitable for this purpose, and serve materially to increase the translucence of the molded piece.

Our invention contemplates broadly the preparation of molding mixtures, and of molded articles of the described type, in which cellulose acetate or its equivalent perform the functions of the usual fibrous filler, in conjunction with a phenol resin, or resin-forming mixture, of any desired composition. Accordingly the procedure as particularly described above is to be regarded as illustrative only, and may be variously modified to secure special technical effects. For example, furfural may be employed as the aldehyde body, either alone or in conjunction with formaldehyde, hexamethylenetetramine or other methylene-containing hardening agent: or the molding mixture may be compounded directly from hexamethylenetetramine-triphenol, furfural, and the cellulose ester: or alternatively from mixtures of hexamethylenetetramine, phenolic body, furfural and other aldehyde bodies, and the cellulose ester. Excellent molding mixtures may also be prepared from mixtures of hexamethylenetetramine-triphenol and cellulose acetate, for example in the proportion of about 100 parts by weight of the tri-phenol compound to 200 parts of the cellulose ester; although the molded product prepared therefrom will not have the transparency of that first above described. All of these and other modifications of the mixtures may be made without departing from the spirit of our invention, and are included under the broad term "potentially reactive phenolic resin" as used herein.

In some instances it may be desirable to incorporate in the mixture partially transformed resin, flock, wood-flour, pigments and inert fillers.

We claim:—

1. A molding mixture comprising a potentially-reactive phenolic resin and a cellulose ester, the ester having a fibrous structure and being present in sucifficient proportion to impart molding capabilities to the mass.

2. A molding mixture comprising a potentially-reactive phenolic resin and cellulose acetate, the acetate having a fibrous structure and being present in sufficient proportion to impart molding capabilities to the mass.

3. A molding mixture comprising in approximately equal proportions a potentially-reactive phenolic resin and a fibrous cellulose ester.

4. A molding mixture comprising in approximately equal proportions a potentially-reactive phenolic resin and fibrous cellulose acetate.

5. The hereindescribed translucent molded product comprising in intimate admixture an infusible phenolic resin and a fiborus cellulose ester.

6. The hereindescribed translucent molded product comprising in intimate admixture an infusible phenolic resin and fibrous cellulose acetate.

7. Process of making a molding mixture comprising compounding a potentially-reactive phenolic resin and a fibrous cellulose ester by a milling operation, the ester in sufficient proportion to impart molding capabilities to the mass.

8. Process of making a molding mixture comprising compounding a potentially-reactive phenolic resin and fibrous cellulose acetate by a milling operation, the acetate in sufficient proportion to impart molding capabilities to the mass.

9. A molding mixture comprising a potentially-reactive phenolic resin, a fibrous cellulose ester, and a plasticizing agent.

10. A molding mixture comprising a potentially-reactive resin, a fibrous cellulose ester, and a phenyl ester.

In testimony whereof, we affix our signatures.

ARCHIE J. WEITH.
OTTO HOLZMAN.